(12) United States Patent
Jüni (10) Patent No.: US 10,625,919 B2
(45) Date of Patent: Apr. 21, 2020

(54) DEVICE FOR PRESERVING BEVERAGES

(71) Applicant: Innveri AG, Murten (CH)

(72) Inventor: Manfred Jüni, Kleingurmels (CH)

(73) Assignee: Innveri AG, Murten (CH)

( * ) Notice: Subject to any disclaimer, the term of this patent is extended or adjusted under 35 U.S.C. 154(b) by 13 days.

(21) Appl. No.: 15/735,500

(22) PCT Filed: Jun. 10, 2016

(86) PCT No.: PCT/IB2016/000787
§ 371 (c)(1),
(2) Date: Dec. 11, 2017

(87) PCT Pub. No.: WO2016/198941
PCT Pub. Date: Dec. 15, 2016

(65) Prior Publication Data
US 2018/0257841 A1    Sep. 13, 2018

(30) Foreign Application Priority Data

Jun. 11, 2015 (AT) .................................. A 367/2015

(51) Int. Cl.
*B65D 81/20* (2006.01)
*B65B 31/04* (2006.01)
(Continued)

(52) U.S. Cl.
CPC ........ *B65D 81/2076* (2013.01); *B65B 31/047* (2013.01); *B65D 39/0076* (2013.01);
(Continued)

(58) Field of Classification Search
CPC ............ B65D 81/2076; B65D 81/2069; B65D 81/2053; B65D 2539/003; B65D 39/0076;
(Continued)

(56) References Cited

U.S. PATENT DOCUMENTS 2,218,318 A * 10/1940 Pfauser .................... F16L 29/04
                                                                        137/614.04
2,823,048 A *  2/1958 Hansen ................. F16L 37/107
                                                                        251/149.6
(Continued)

FOREIGN PATENT DOCUMENTS

| EP | 1145640 A1 | 10/2001 |
| FR | 2588531 A1 | 4/1987 |
| WO | 2009/147506 | 12/2009 |

OTHER PUBLICATIONS

International Search Report for PCT/IB2016/000787 dated Sep. 9, 2016 submitted herewith, 7 pages.
(Continued)

*Primary Examiner* — Andrew D StClair
(74) *Attorney, Agent, or Firm* — Fitch, Even, Tabin & Flannery, LLP (57) ABSTRACT

A closure element for liquid containers, in particular bottles, includes a stopper engaging the opening of the liquid container (e.g., a neck of a bottle) and a cap (5) covering the edge of the neck opening, the stopper including an inlet channel passing therethrough and optionally an outlet channel, the inlet channel and optionally the outlet channel (42) are respectively provided with an inlet valve or outlet valve, which may be a pressure relief valve (21).

18 Claims, 5 Drawing Sheets

(51) Int. Cl.
*B65D 39/00* (2006.01)
*B65D 51/16* (2006.01)
*C12H 1/00* (2006.01)

(52) U.S. Cl.
CPC ..... *B65D 51/1644* (2013.01); *B65D 81/2053* (2013.01); *C12H 1/00* (2013.01); *B65D 2539/003* (2013.01)

(58) Field of Classification Search
CPC ... B65D 51/1644; B65B 31/04; B65B 31/044; B65B 31/046; B65B 31/047; F16K 15/142; F16L 29/02; F16L 29/04
See application file for complete search history.

(56) References Cited

U.S. PATENT DOCUMENTS

| | | | | |
|---|---|---|---|---|
| 3,084,823 | A | | 4/1963 | Reichstein |
| 3,215,298 | A | * | 11/1965 | Shaffer .................. B65D 45/18 215/270 |
| 4,346,704 | A | * | 8/1982 | Kulle .................... A61M 5/168 137/516.15 |
| 4,475,576 | A | * | 10/1984 | Simon ..................... C12H 1/16 141/302 |
| 4,640,426 | A | * | 2/1987 | Wasley ................. B65B 31/047 215/228 |
| 4,763,803 | A | * | 8/1988 | Schneider ............ B65B 31/047 141/65 |
| 5,329,975 | A | * | 7/1994 | Heitel ................. B01F 3/04801 141/19 |
| 7,243,682 | B2 | * | 7/2007 | Brandes ................ F16K 15/142 137/512.15 |
| 2009/0008356 | A1 | * | 1/2009 | Gadzic ................. B65D 47/265 215/310 |
| 2010/0327010 | A1 | | 12/2010 | Manera et al. |
| 2014/0263453 | A1 | * | 9/2014 | Haley ................... B65D 39/00 222/152 |

OTHER PUBLICATIONS

Written Opinion of the International Searching Authority (English) for PCT/IB2016/000787, 5 pages.
International Preliminary Report on Patentability Chapter II, English Translation, issued re PCT/IB2016/000787, dated Oct. 25, 2017.

* cited by examiner

DEVICE FOR PRESERVING BEVERAGES

CROSS-REFERENCE TO RELATED APPLICATIONS

This application is the U.S. national phase application filed under 35 U.S.C. § 371 of International Application No. PCT/IB2016/000787, filed Jun. 10, 2016, designating the United States, and claims priority from Austrian Patent Application No. A 367/2015, filed Jun. 11, 2015, and the complete disclosures of which applications are hereby incorporated herein by reference in their entirety for all purposes.

The invention relates to a closure element for liquid containers, in particular bottles, comprising a stopper engaging the neck opening of the liquid container and a cap covering the edge of the neck opening, said stopper comprising an inlet channel passing therethrough and optionally an outlet channel.

The invention further relates to a device for preserving liquids in the household with the aid of a protective gas, comprising at least one handheld device connectable to, or comprising, a gas reservoir and having its own valve alternatively releasing or retaining the protective gas in order to respectively release or retain the discharge of the protective gas from a discharge-side end of the handheld device.

In the context of the preservation of foods with the aid of a protective gas, experts speak of MAP (modified atmosphere packaging).

By container, any receptacle that serves to receive liquids, such as bottles, glasses, cans and the like are to be understood in the context of the invention.

A device for preserving foods can, for instance, be taken from EP 1145640 A1. It serves to fill the volume of a gas-tightly sealed food container with an inert gas and, in particular, for instance carbon dioxide ($CO_2$), while simultaneously forcing out the air present in the container. During such a flushing operation, inert gas is filled in via an inlet valve, while the air escapes through a separate outlet valve at the same time. After the flushing operation, the food stored in the food container will be in a protective atmosphere such that its shelf life will be considerably improved.

In the prior art (e.g. WO 2009/147506 A2), specially equipped food containers, in particular food containers equipped with inlet and outlet valves, are provided to enable MAP. The storage of foods in specially equipped containers has proved to be successful in practice. For the storage of liquids, it is, however, not necessarily practicable to transfer the liquid into a separate container in order to use the MAP technology. In particular with beverages such as wine, sparkling wine or champagne, it is desirable to effect such protective gas preservation in the original bottle.

The invention, therefore, aims to enable MAP specifically for liquids in containers used in the household and in the catering trade and to provide the appropriate components of an overall concept with a view to enabling the end user to preserve the freshness and quality of liquids without major expense. After each opening of the container, it should be possible for the end user to briefly and simply flush, or provide, the same with protective gas after reclosing so as to be able to store the liquid in an optimum atmosphere and/or under overpressure.

To solve this object, the invention provides a container closure for closing a beverage container, in particular bottle, which is equipped with the required channels and valves in order to enable the filling and/or flushing of the container with a protective gas. The closure according to the invention comprises a stopper engaging the (neck) opening of the liquid container and a cap covering the edge of the neck opening, said stopper comprising an inlet channel passing therethrough and optionally an outlet channel, wherein the inlet channel and optionally the outlet channel are respectively provided with an inlet valve or outlet valve designed as a pressure relief valve. The stopper and the cap portions of the closure are interconnected to a joint closure part, or designed in one piece. The closure allows for the filling and/or flushing of the container with a protective gas in the closed state. The protective gas can be injected into the interior of the container through the closure via the inlet channel and the inlet valve, wherein the inlet valve is designed as a pressure relief valve such that the inlet valve will automatically open as soon as the protective gas fed from a protective gas source is applied at a sufficiently high gas pressure. When the filling or flushing operation is completed, the inlet valve closes automatically. An outlet channel separate from the inlet channel and comprising an outlet valve likewise designed as a pressure relief valve may be provided for discharging from the container the air present in the container and optionally the protective gas. The discharge of gas from the container takes place as soon as the gas pressure in the container has exceeded a predetermined limit value. The provision of an outlet channel including an outlet valve may, however, also be renounced if no flushing process but only filling with a protective gas is desired.

The following operation variants are conceivable with the container closure according to the invention:

a) "Flushing and overpressure": The air in the container is completely or partially replaced by the protective atmosphere, wherein the introduction of the protective gas is continued until a defined overpressure is reached in the container. This variant, as a rule, is used with all kinds of liquids that have to be protected from oxidation and with which, depending on the field of application, also the escape of carbon dioxide is to be prevented. The container should exhibit a sufficiently low permeability for oxygen/gas, and hence have strong barrier properties, since otherwise too much gas might escape. In general, there should be an overpressure of 1-4 bar in the container in the event of carbonated liquids, and a residual oxygen content of 1 to 2% should not be exceeded so as to prevent oxidation. In order to enable both flushing and an overpressure, the closure according to the invention in addition to the inlet channel is provided with an outlet channel, wherein the inlet valve and the outlet valve are matched to each other such that the inlet valve opens at a lower overpressure than the outlet valve. It is thus ensured that at first the inlet valve is opened and, after this, a continuous pressure build-up takes place in the interior of the container until the opening pressure of the outlet valve is reached. When reaching the opening pressure of the outlet valve, gas escapes from the interior of the container until the desired degree of gas exchange or flushing is achieved. After this, the supply of the protective gas is reduced, or interrupted at once, such that also the inlet valve closes. Due to the different opening pressure values of the inlet and outlet valves, an overpressure will remain in the interior of the container after termination of the gas supply.

b) "Flushing": The air in the container is completely or partially replaced by the protective atmosphere. This, as a rule, is applied with all kinds of liquids that have to be protected from oxidation and where the container comprises a sufficiently low permeability for oxygen/gas, since otherwise too much gas may escape. In general, the residual oxygen content in such containers should be below 1 to 2%. With higher oxygen values, MAP cannot be optimally used in terms of oxidation protection. The described mode of operation requires a closure that comprises both an inlet channel and an outlet channel. The opening pressure of the outlet valve is chosen to be equal to, or smaller than, that of the inlet valve. Alternatively, an outlet valve may also be completely renounced such that the air present in the container may freely escape, and substantially no overpressure will remain in the container after completion of the flushing operation.

c) "Overpressure": The supplied protective gas serves to set the container under pressure by the protective atmosphere, the protective atmosphere additionally protecting the liquid. Closure systems suitable for the mode "overpressure" merely have to comprise an inlet channel, but no outlet channel. The container must have a sufficiently low permeability for oxygen/gas, since otherwise too much gas may escape. In general, an overpressure of 1-4 bar should be attained in the container to prevent the escape of carbon dioxide.

In all three variants, it is important that the inlet valve and optionally the outlet valve are opened by the appropriate gas pressure such that no manual operation is needed and the construction can be devised in a correspondingly simple and space-saving manner.

According to a preferred configuration, it is provided that the inlet valve and the outlet valve are operable independently of each other.

In order to provide a configuration as small-structured as possible, in which the disposition of the inlet channel and the inlet valve, and optionally also of the outlet channel and the outlet valve, is feasible within the cross section of the container opening, in particular in the neck of the bottle, it is advantageous that the closure is comprised of as small a number of components as possible. A preferred configuration in this respect contemplates that the stopper comprises a stopper base body made of an elastomer, which has at least one sealing lip on its outer circumference and forms the sealing body of the inlet and/or outlet valve, which is deflectable by the applied overpressure. The stopper base body thus not only ensures the function of the outer seal relative to the container opening, in particular in the neck of the bottle, with the aid of the sealing lip but, at the same time, also forms the sealing body of the inlet valve. In this respect, the sealing body is preferably designed as a sleeve that is radially expandable by the applied overpressure. The sleeve-shaped sealing body, in particular, surrounds a mandrel into whose peripheral surface at least one bore of the inlet channel opens. As soon as the gas pressure applied to the bore exceeds a defined limit value, the elastomeric sealing sleeve is radially expanded, at least locally leaves its position abutting on the mandrel, and thereby clears the mouth of the bore such that the gas will be able to flow between the outer surface of the mandrel and the inner surface of the sealing body.

The elastomeric stopper base body preferably comprises an annular, flange-like protrusion departing from the stopper and covering the edge of the container opening, thus forming a part of the cap. In this context, it is preferably provided that the inlet channel opens eccentrically into the container opening, in particular into the neck of the bottle. Such geometry of the closure system causes an air flow to be generated within the container in such a manner that the introduced protective gas displaces the air present in the container, and hence ensures that the introduced protective gas, due to the advantageously produced circular flow in the interior of the container, will fill the entire volume within a short time without too large an amount of protective gas being again lost by escaping.

In a preferred manner, the configuration is further developed such that the inlet valve is disposed radially offset to the outlet valve and the gas flow on the inlet valve is conducted so as to produce the desired circular flow in the container.

The cap advantageously comprises a substantially central inlet opening in connection with the inlet channel for attaching or connecting a protective gas source. The inlet opening is designed such that the discharge-side end of a handheld device can be attached for delivering the protective gas.

In order that the handheld device does not prevent the exit of gas escaping from the interior of the container in the position placed to the inlet opening of the closure, it is preferably provided that the cap comprises a preferably annular outlet opening located radially outside the inlet opening and communicating with the outlet channel. The gas will thus escape radially outside the handheld device. In order to prevent the liquid possibly entrained by the escaping gas from splashing against the user, a preferred further development contemplates that the outlet channel, via at least one radial bore, opens into an outlet chamber communicating with the environment via the outlet opening. The gas and the optionally entrained liquid, in the radial direction, thus initially reach an outlet chamber disposed in the opening region, where possible liquid is braked and able to collect, and from where the likewise braked gas is finally able to axially leave the closure via the outlet opening.

In structural terms, an advantageous configuration comprising as few parts as possible will result if the inlet opening and optionally the outlet opening are formed in a cap base body connected to, in particular plugged into, the stopper, in particular the stopper base body.

It may, furthermore, be provided that at least one portion of the outlet channel is formed in an insert inserted in, in particular plugged into, a recess of the stopper, in particular of the stopper base body. The insert preferably forms the protruding end portion of the inlet channel.

In order to take into account the overpressure produced in the container in specific applications such as the preservation of carbonated liquids like champagne, the closure may be equipped with retaining clamps. The closure system is thus fixed to the container, withstanding such overpressure. In this respect, it is, in particular, provided that two retaining clamps are pivotally fastened to the cap.

In addition to the closure system, the invention inter alia aims to provide a simple, handy and mobile handheld device that excels by its ease of use and meets the needs of a household. The handheld device may be dimensioned for a plurality of applications without requiring the permanent exchange of gas cartridges or the like. Moreover, the handheld device is able to define the required amount of protective atmosphere. In addition, safety-engineering problems concerning the storage and use of gas under high pressure are to be avoided.

Conventional devices can be improved to the effect that the structural expense will be reduced, in particular for the handheld device, and the combination of a multifunctional closure system with MAP technology will significantly facilitate, and make safer, the preservation of liquids.

To solve this object, the invention provides a device for preserving liquids in the household with the aid of a protective gas, comprising at least one handheld device connectable to, or comprising, a gas reservoir and having its own valve alternatively releasing or retaining the protective gas in order to respectively release or retain the discharge of the protective gas from a discharge-side end of the handheld device, and further comprising a container closure according to the invention as claimed and described above.

In a preferred manner, the handheld device is comprised of a housing having an integrated gas reservoir, said gas reservoir being received in the housing in a preferably exchangeable manner. This enables the use of gas reservoirs containing different gases or gas mixtures. As gas reservoirs, gas cartridges, in particular so-called small cartridges having volumes of e.g. 10-40 ml, are, for instance, used. In the handheld device may be mounted a piercing mandrel to activate the inserted gas reservoir. The control of the desired protective gas extraction amount in the interaction with the container closure system can be effected by an integrated valve to be opened via an actuating member. Downstream of the valve, viewed in the flow direction, a nozzle may be provided, in particular a nozzle having a flow cross section decreasing in the flow direction. The configuration in this context is preferably further developed to the effect that the valve of the handheld device comprises an actuating member designed as a valve member displaceable against the force of a spring or cooperating therewith.

The handheld device thus enables the protective gas to be supplied to a container via the container closure according to the invention without coupling to a stationary device. The actuation of the valve of the integrated handheld device can be effected with the aid of an actuation knob, or by placing the handheld device on the container closure so as to displace the actuating member of the handheld device. A preferred configuration in this context provides that the container closure comprises a protruding mandrel in the region of the inlet opening, which moves the actuating member of the handheld device when attaching the discharge-side end of the handheld device to the inlet opening, and opens the valve.

In the following, the invention will be explained in more detail by way of exemplary embodiments schematically illustrated in the drawing. Therein.

Figure 1:
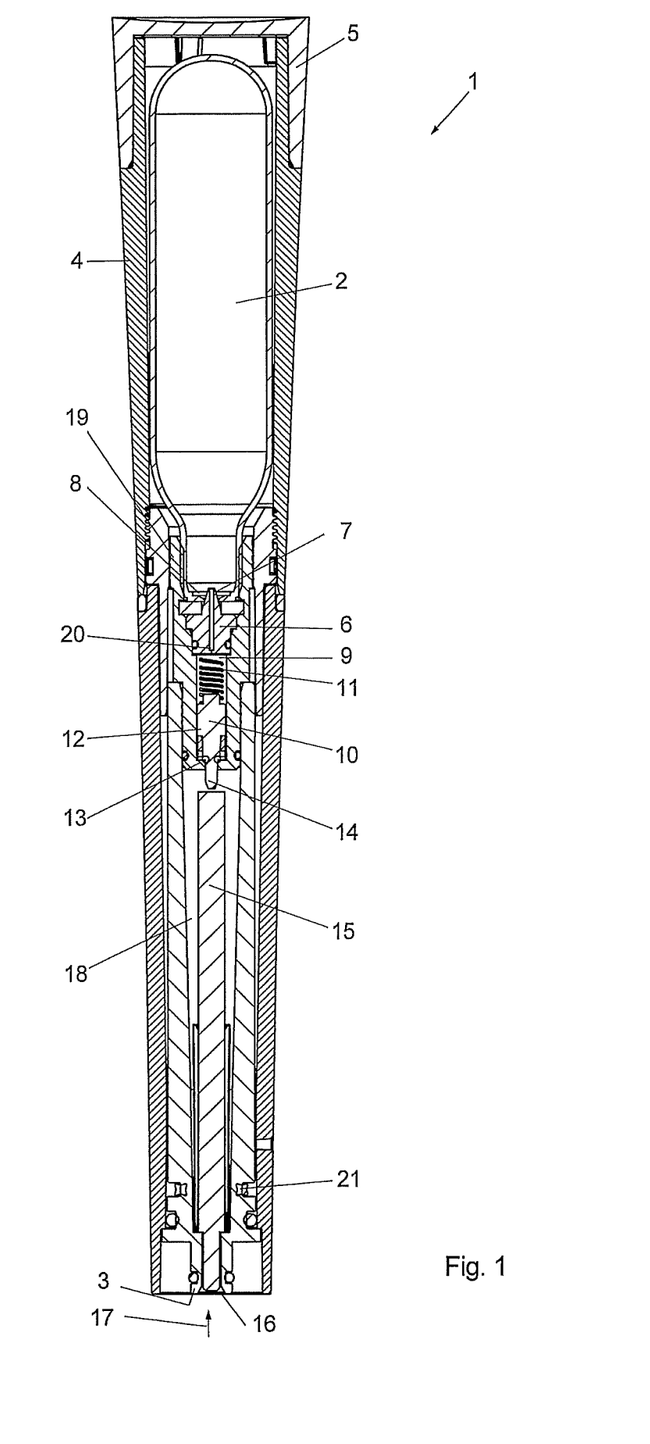
FIG. 1 is a sectional view of a handheld device including a gas reservoir.

FIG. 1 depicts a handheld device 1 that serves to receive a protective gas reservoir 2 and to controlledly discharge the protective gas via a discharge opening 3. The handheld device 1 comprises a housing 4 closed on its rear side by a cap 5. In the removed state of the housing 4 plus cap 5, a protective gas reservoir 2 such as a gas cartridge can be inserted into the protective gas reservoir reception 19. The handheld device 1 further comprises a piercing element 6 including a hollow needle 7 protruding in the direction of the gas reservoir 2 and adapted to pierce a sealing cap 8 of the gas reservoir 2. In the pierced state, the interior of the gas reservoir 2 communicates with the valve chamber 9 of a valve 10 via the hollow needle 7. The valve comprises a valve member 12, which is displaceable in the axial direction against the force of a spring 11 and whose sealing surface, in the closed state of the valve, rests against a valve seat formed on a component 13. The valve closing member 12 comprises a protrusion 14 having a stop surface cooperating with an actuating pin 15. The actuating pin 15 extends as far as to the discharge opening 3, and there provides an abutment surface 16 cooperating with the container closure through a mandrel, which will be explained in more detail below. When placing the handheld device 1 on the inlet opening of the container closure, the actuating pin 15 is rearwardly displaced in the sense of arrow 17 and, via the protrusion 14, actuates the valve closing member 12, thus releasing the gas flow from the protective gas reservoir 2 via the hollow needle 7, through a nozzle 20, the valve chamber 9, the opened valve seat on the component 13, a flow chamber 18, and the discharge opening 3. As already mentioned, gas flows through the nozzle 20 following the hollow needle 7, the flow cross section of which nozzle decreases in the flow direction such that the volume flow of the gas will be reduced accordingly. A pressure relief valve 21 protects the container to be filled with protective gas from excessive pressure.

Figure 2:
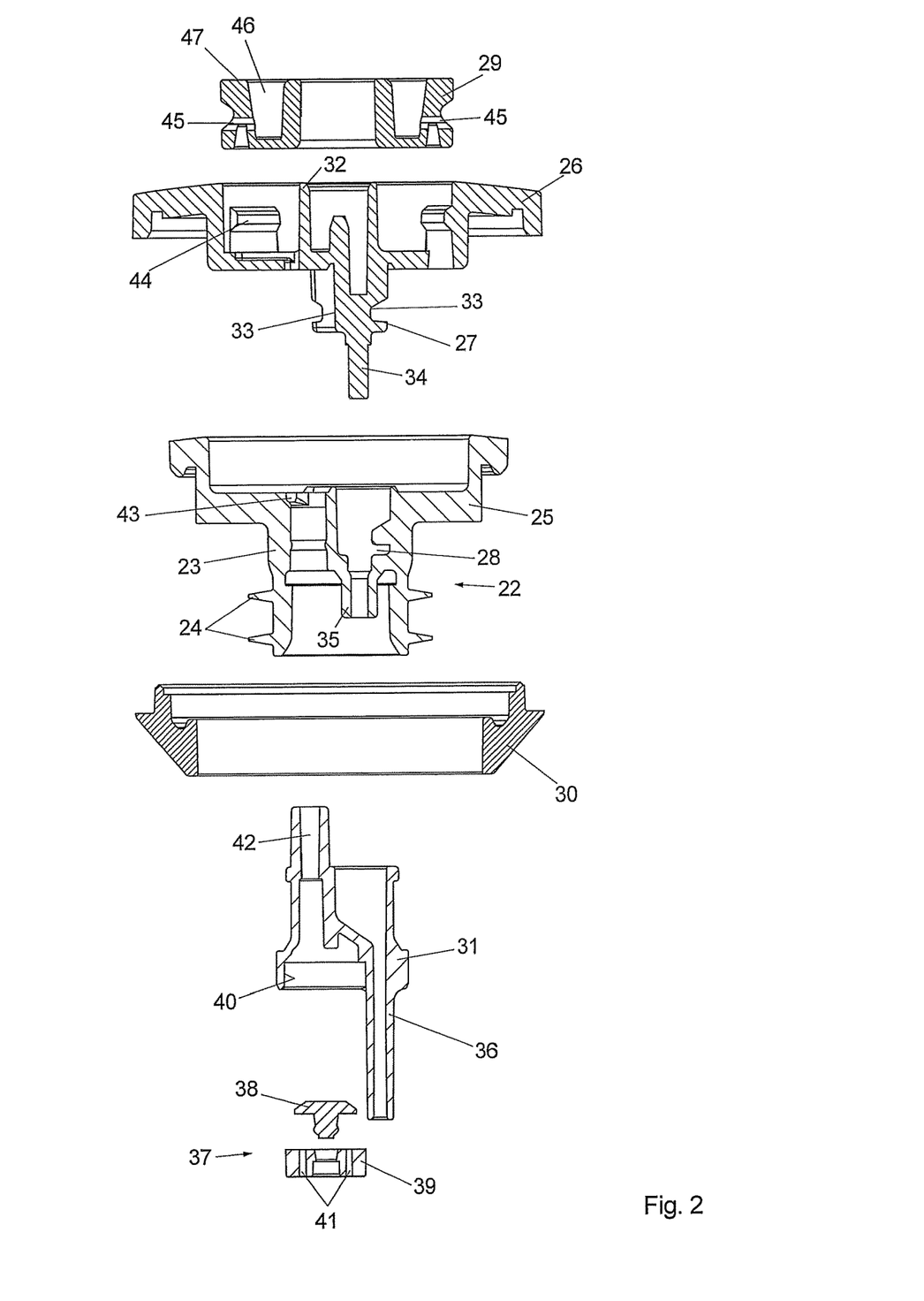
FIG. 2 is a sectional view of a configuration of a bottle closure unit according to the invention in an exploded illustration.

FIG. 2 illustrates the closure according to the invention, via which the protective gas discharged from the handheld device 1 is introduced into the closed container. The closure comprises a stopper 22, which is substantially comprised of a stopper base body 23, about whose circumference two circumferential sealing lips 24 are formed. The sealing lips 24 cooperate with the inner wall of the neck of the bottle in the state engaging the neck of the bottle, in order to appropriately seal the closure. The stopper base body 23 comprises an annular, flange-like protrusion 25 departing from the stopper 22 and covering the edge of the bottle opening, thus forming a part of the closure cap. The stopper base body 23 is made of an elastomeric material.

The bottle closure further comprises a cap portion 26 made of plastic or any other hard material, which can be inserted or pushed into the stopper base body 23, the necessary holding force being ensured by the protrusion 27 engaging a suitable recess 28 of the stopper base body 23. The closure further comprises a terminating ring 29 to be inserted into the cap portion 26, a counter-ring 30, and a combined inlet and outlet unit 31, which can be inserted or plugged into the stopper base body 23.

The closure illustrated in FIG. 2 comprises an inlet channel and an outlet channel each with the associated inlet valve or outlet valve, respectively. The inlet channel plus inlet valve serves to conduct the protective gas delivered by the handheld device 1 through the closure into the container, in particular the bottle. The outlet channel plus optional outlet valve serves to allow the air present in the container, in particular the bottle, to escape where flushing of the container is desired. The inlet opening of the closure is formed on the cap portion 26 and denoted by 32. Protective gas introduced via the inlet opening 32 subsequently flows through bores 33 depicted in broken lines and opening on the circumference of a mandrel 34. In the state of the cap portion 26 inserted in the stopper base body 23, the mandrel 34 is surrounded by a sleeve-shaped sealing body 35 formed in one piece with the stopper base body 23. The sealing body 35 seals the mouths of the bores 33. As long as an appropriate gas pressure is applied to the mouths of the bores 33, the sealing body 35 is radially expanded, allowing gas to flow through an annular space forming between the outer surface of the mandrel 34 and the inner surface of the sealing body 35. After this, the gas reaches the combined inlet and outlet unit 31, and there flows through an end portion 36 of the inlet channel into the interior of the container.

If flushing of the container interior is desired, the combined inlet and outlet unit 31 comprises an outlet valve 37, which includes a flexible sealing cap 38 inserted in a bush-shaped part 39. In the assembled state, the bush-shaped part 39 is in turn inserted in a respective recess 40 of the combined inlet and outlet unit 31. The bush-shaped part 39 comprises two bores 41, via which the gas escaping from the container flows, wherein the sealing cap 38 covering the bores 41 is elastically deflected at a suitable overpressure in order to release the gas flow through the outlet channel 42. The outlet channel 42 opens into a connection channel 43 formed in the stopper base body 23 and opening into an annular chamber 44 provided in the cap portion 26. The annular chamber 44, via radial bores 45, is in turn connected to an annular outlet chamber 46 provided in the terminating ring 29. The gas is thus able to escape to the outside via the outlet chamber 46 and the outlet opening 47.

Figure 3:
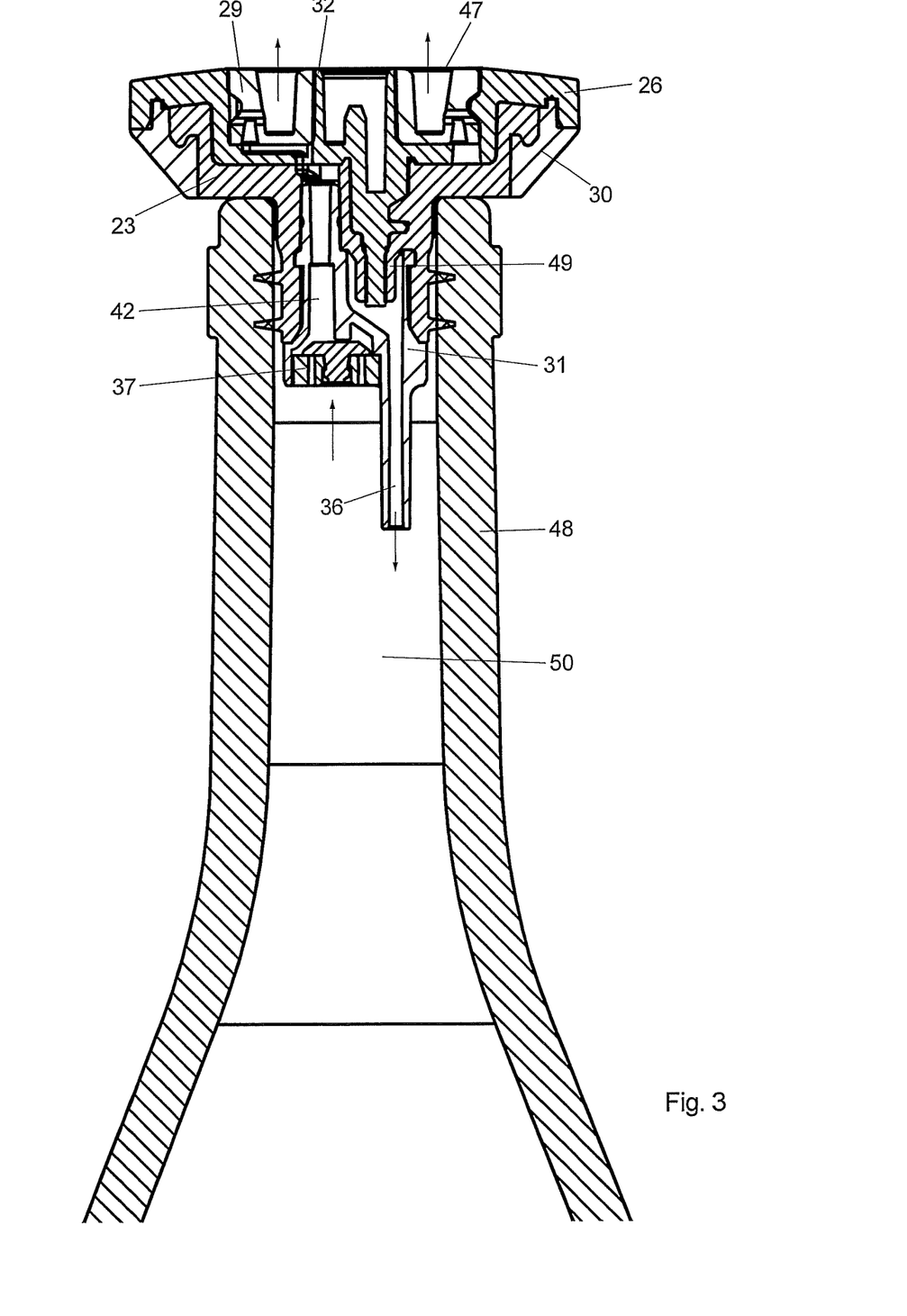
FIG. 3 is a sectional view of the bottle closure unit according to FIG. 2 in a state inserted in the neck of a bottle.

FIG. 3 depicts the closure illustrated in FIG. 2 in the assembled state inserted in a bottle 48. As soon as an appropriate gas pressure is applied to the inlet opening 32, the inlet valve, which is schematically denoted by 49, opens such that gas enters the interior 50 of the bottle via the end portion 36 of the inlet channel. An appropriate gas pressure is building up in the gas volume of the partially filled bottle 48 until the outlet valve 37 is opened and the respective overpressure is able to escape through the outlet channel 42 and the outlet opening 47. The end portion 36 of the inlet channel is disposed eccentrically and protrudes from the stopper 22 so as to cause a circular flow in the interior 50 of the bottle 48 to promote flushing of the gas volume. The escape of the gas from the interior 50 of the bottle 48 also takes place eccentrically, namely via the outlet valve 37 disposed diametrically to the inlet channel 36. Flushing of the gas volume, i.e. the escape of the air present in the interior 50 of the bottle 48, is thus enabled. At the same time, an overpressure is maintained in the interior 50 of the bottle 48 due to the design of the outlet valve 37.

Figure 4:
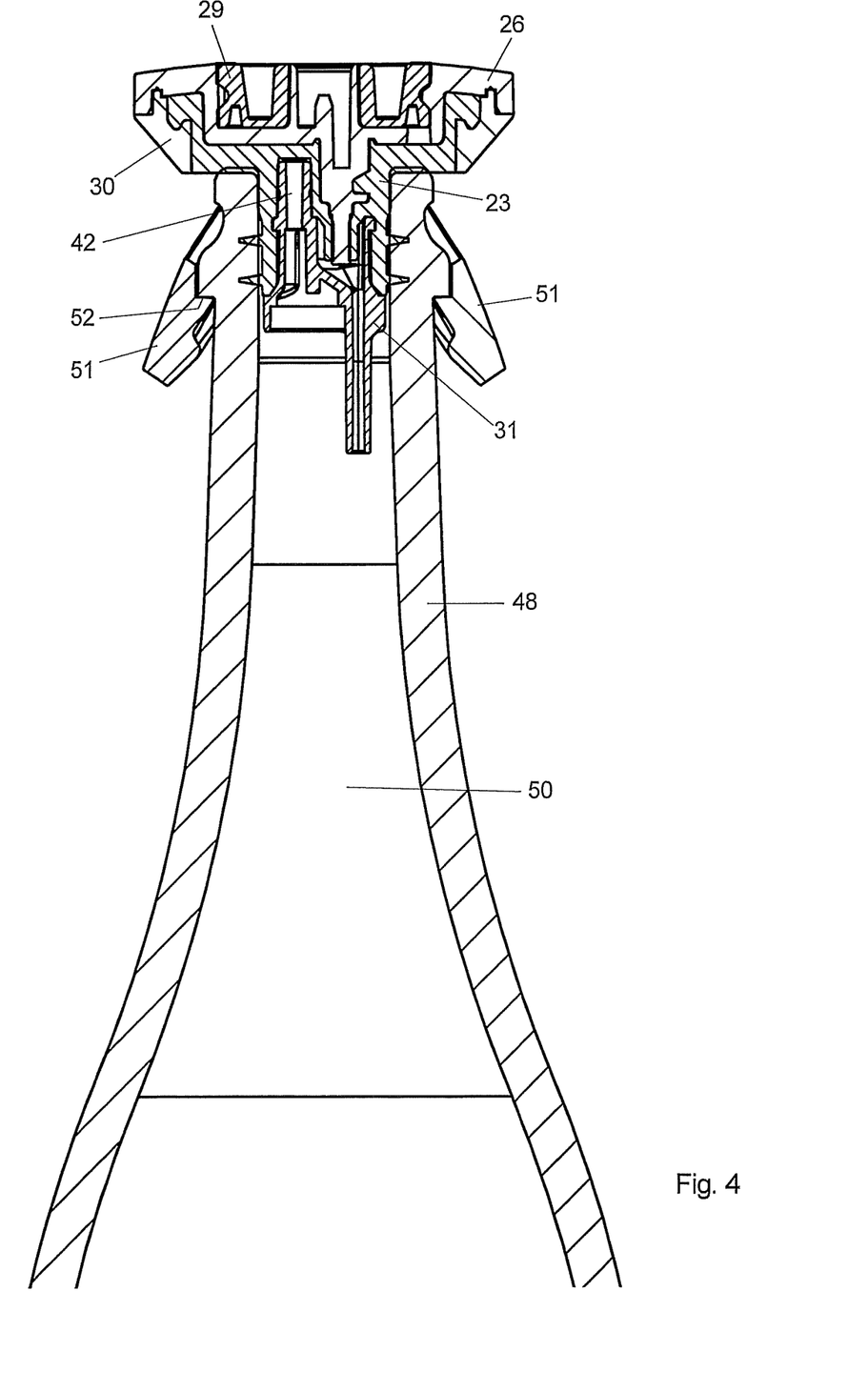
FIG. 4 is a sectional view of a modified configuration of the bottle closure unit in a state inserted in the neck of a bottle.

FIG. 4 depicts a modified configuration of the bottle closure, in which no outlet channel, and hence no outlet valve, are provided. The bottle closure is, in particular, suitable for carbonated beverages such as champagne, with which an overpressure in the bottle interior 50 is to be generated in the first place. As in contrast to the illustration according to FIGS. 2 and 3, the bottle closure now comprises two pivotally arranged retaining clamps 51 designed to engage from behind a circumferential shoulder 52 provided on the neck of the bottle. As in contrast to the configuration according to FIGS. 2 and 3, the stopper base body 23 does not comprise a connection channel such that the escape of gas from the interior 50 of the bottle 48 via the outlet channel 42 is not possible.

In another modification of the closure, which is not illustrated, an outlet channel 42 may be provided, yet no outlet valve 37. In such a configuration, flushing of the gas volume of the bottle 48 is possible. However, no build-up of an overpressure in the interior 50 of the bottle 48 is provided.

An inert gas such as argon, and/or $CO_2$ is, for instance, provided as protective gas filled into the interior of the bottle. Preferred are gases that are heavier than air such that the protective gas will settle on the surface of the liquid present in the bottle 48 in order to prevent oxidation processes. Furthermore, the use of a protective gas heavier than air will cause the protective gas to remain in the bottle even in a configuration comprising an outlet channel, yet no outlet valve.

Figure 5:
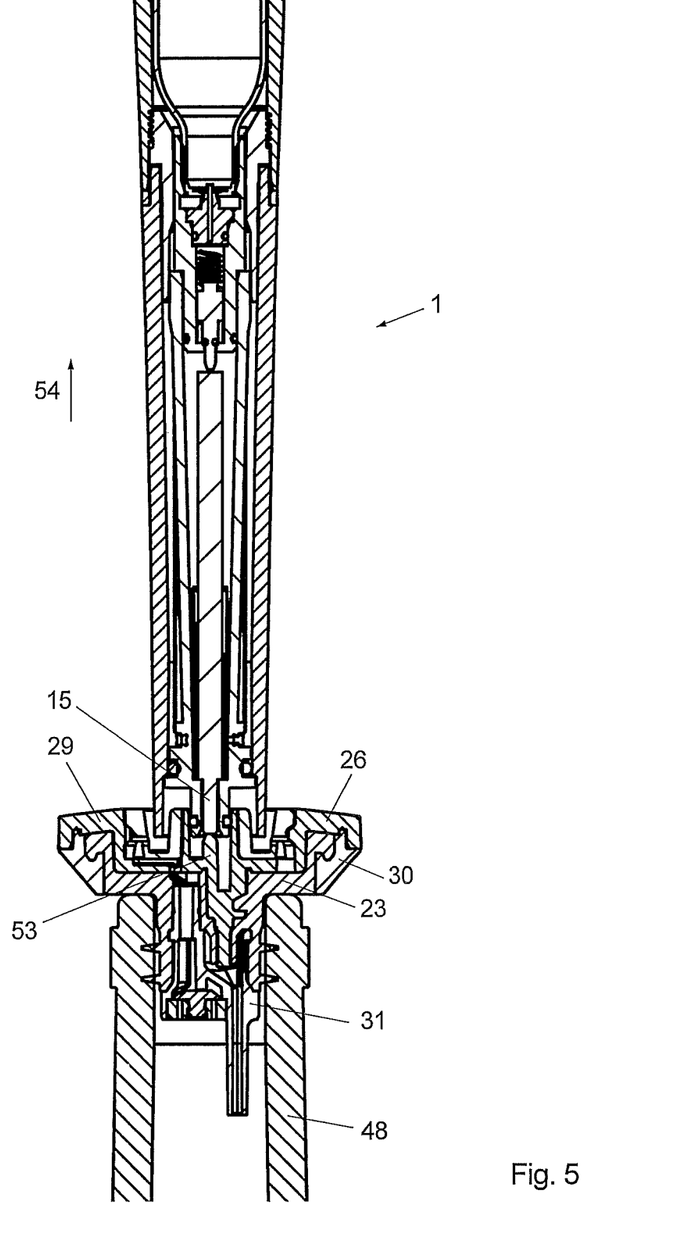
FIG. 5 a sectional view of the bottle closure unit according to FIG. 2 in the actuated state with the handheld device attached.

FIG. 5 depicts the handheld device 1 in a position placed on the inlet opening 32 of the bottle closure. The bottle closure is represented in the configuration according to FIGS. 2 and 3, the cooperation of the handheld device 1 with the inlet opening 32 of the closure depicted in FIG. 5 applying in the same manner for the modified configuration of the bottle closure according to FIG. 4 or the further modified configuration without outlet valve.

From FIG. 5, it is apparent that a protruding mandrel 53 disposed in the region of the inlet opening 32 displaces the actuating pin 15 of the handheld device 1 rearwardly in the sense of arrow 54 when attaching the handheld device 1, thus causing the valve 10 of the handheld device 1 to be opened and the gas flow from the protective gas reservoir 2 to be released.

The invention claimed is:

1. A closure element for a container for a liquid, the container having a neck, a neck opening, and an outer edge to the neck opening, the closure element comprising
    a stopper configured to engage the neck opening of the liquid container; and
    a cap configured to cover the edge of the neck opening, said stopper comprising an inlet channel passing therethrough and an outlet channel, wherein the inlet channel and the outlet channel are respectively provided with an inlet valve and an outlet valve, wherein each valve is configured as a pressure relief valve,
    wherein said stopper comprises a stopper base comprised of an elastomer, the stopper having at least one sealing lip on its outer circumference, the stopper forming a sealing body of the inlet valve, and the sealing body is deflectable by applied overpressure so as to open the inlet valve,
    wherein the cap comprises a substantially central inlet opening in connection with the inlet channel for attaching or connecting a protective gas source,
    wherein the cap comprises an annular outlet opening located radially outside the central inlet opening and communicating with the outlet channel,
    wherein the outlet channel, via at least one radial bore, opens into an outlet chamber communicating, via the outlet opening, outside of the liquid container.

2. The closure element according to claim 1, wherein the inlet valve and the outlet valve are operable independently of each other.

3. The closure element according to claim 1, wherein the sealing body comprises a sleeve that is radially expandable by applied overpressure, wherein the sealing body surrounds a mandrel into whose surface at least one bore of the inlet channel opens, whereby overpressure applied to the bore radially expands the sealing body.

4. The closure element according to claim 1, wherein the inlet channel opens eccentrically into the container opening or the neck of the container.

5. The closure element according to claim 1, wherein the inlet channel comprises an eccentrically disposed end portion protruding from the stopper.

6. The closure element according to claim 1, wherein the central inlet opening, the annular outlet opening, or both the central inlet opening and the annular outlet opening are formed in a cap base body connected to the stopper.

7. The closure element according to claim 1, wherein at least one portion of the outlet channel is formed in an insert inserted in a recess of the stopper.

8. The closure element according to claim 7, wherein the insert forms the protruding end portion of the inlet channel.

9. The closure element according to claim 7, wherein the insert comprises an outlet valve.

10. The closure element according to claim 1, wherein the outlet channel includes an inflow opening, and the inlet channel includes a mouth, wherein the inflow opening is disposed eccentrically or diametrically to the mouth of the inlet channel.

11. The closure element according to claim 1, wherein the closure element further comprises two retaining clamps pivotally fastened to the cap.

12. A device for preserving liquids in the household with the aid of a protective gas, comprising
at least one handheld device connectable to, or comprising, a gas reservoir and said at least one hand held device having its own valve alternatively releasing or retaining the protective gas in order to respectively release or retain the discharge of the protective gas from a discharge-side end of the handheld device, and said handheld device having a nozzle for controlling the gas flow, and
further comprising the container closure according to claim 1.

13. The device according to claim 12, wherein the valve of the handheld device comprises an actuating member designed as a valve member displaceable against the force of a spring or cooperating therewith.

14. The device according to claim 13, wherein the container closure further comprises a protruding mandrel in the region of the inlet opening, wherein the protruding mandrel displaces the actuating member of the valve of the handheld device when placing the discharge-side end of the handheld device to the inlet opening and thereby opens the valve of the handheld device.

15. The device according to claim 12, wherein the inlet valve and the outlet valve of the closure element, and the valve of the handheld device, close automatically when removing the handheld device from the container.

16. The closure element according to claim 6, wherein the stopper has a base body, and the cap base body is connected by being plugged into the stopper base body.

17. The closure element according to claim 7, wherein the insert is plugged into a recess of the stopper base body.

18. A closure element for a container for a liquid, the container having a neck, a neck opening, and an outer edge to the neck opening, the closure element comprising
a stopper configured to engage the neck opening of the liquid container; and
a cap configured to cover the edge of the neck opening, said stopper comprising an inlet channel passing therethrough and an outlet channel, wherein the inlet channel and the outlet channel are respectively provided with an inlet valve and an outlet valve, wherein each valve is configured as a pressure relief valve,
wherein said stopper comprises a stopper base comprised of an elastomer, the stopper having at least one sealing lip on its outer circumference, the stopper forming a sealing body of the inlet valve, and the sealing body is deflectable by applied overpressure so as to open the inlet valve,
wherein the container for a liquid comprises a bottle,
the closure element is configured for the bottle;
the inlet valve and the outlet valve are operable independently of each other;
the sealing body comprises a sleeve that is radially expandable by the applied overpressure;
the inlet channel opens eccentrically into an opening of the bottle or the neck of the bottle;
the inlet channel comprises an eccentrically disposed end portion protruding from the stopper;
the cap comprises a substantially central inlet opening in connection with the inlet channel for attaching or connecting a protective gas source;
the cap comprises an annular outlet opening located radially outside the inlet opening and communicating with the outlet channel; and
the outlet channel, via at least one radial bore, opens into an outlet chamber communicating with the environment via the outlet opening.

* * * * *